Nov. 12, 1946.  L. A. SCHOLZ  2,410,842
AUTOMATIC TURRET FOR AERIAL CAMERAS
Filed Sept. 13, 1944  4 Sheets-Sheet 1

INVENTOR.
LOUIS A. SCHOLZ
BY Joseph W. Hazell
and Elade Koontz
ATTORNEYS

Nov. 12, 1946.   L. A. SCHOLZ   2,410,842
AUTOMATIC TURRET FOR AERIAL CAMERAS
Filed Sept. 13, 1944   4 Sheets-Sheet 2

INVENTOR.
LOUIS A. SCHOLZ

INVENTOR.
LOUIS A. SCHOLZ
ATTORNEYS

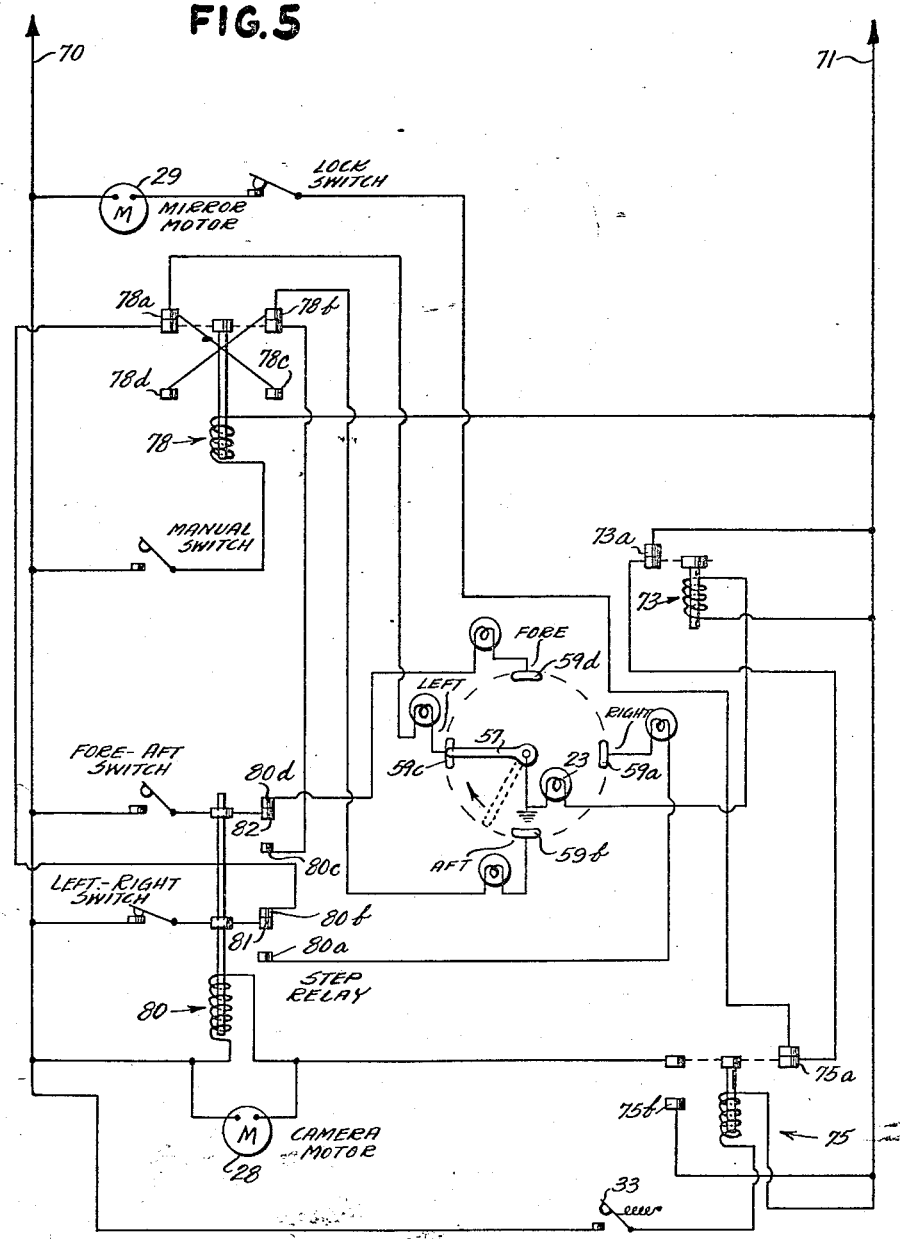

Patented Nov. 12, 1946

2,410,842

UNITED STATES PATENT OFFICE 2,410,842

AUTOMATIC TURRET FOR AERIAL CAMERAS

EXAMINER'S COPY

Louis A. Scholz, Dayton, Ohio

Application September 13, 1944, Serial No. 553,849

27 Claims. (Cl. 95—12.5)

(Granted under the act of March 3, 1883, as amended April 30, 1928; 370 O. G. 757)

The invention described herein may be manufactured and used by or for the Government for governmental purposes, without the payment to me of any royalty thereon.

This invention relates to aerial photography and more particularly to aerial camera of the type designed to take substantially horizontal panoramic views from an airplane, and it has for an object to provide a mechanism for quick and convenient directional control of an aerial camera. A further object of the invention is to provide an arrangement of elements of a photographic optical system adapted to extend exteriorly of an airplane and having a novel structure to minimize interference with the air stream. In accordance with the objects, I provide an aerial camera comprising a motor driven camera and a mirror disposed in angular relation to the camera film plane so that the scene to be photographed is reflected from the mirror through the camera lens, in one form of the invention, or through the camera lens to the mirror in another form, and thence to the film plane of the camera. By mounting the mirror, or the mirror and the lens, in a horizontally rotatable symmetrically contoured dome disposed in the air stream beneath the fuselage and providing the dome with a transparent window for passing light rays from the object terrain, photographs may be obtained in substantially horizontal directions; since the bulk of the camera and controlling mechanism is housed within the airplane fuselage, the only protruding portion of the device is the substantially symmetrical dome. Such a construction produces a minimum of air resistance for the results obtained and in conjunction with a novel control system which synchronizes the camera motor with rotation of the dome to preset positions, the terrain over which the airplane is flying may be photographed in various directions at the will of the pilot with very little attention drawn from the task of piloting the airplane. The control system is so devised that directional control of the rotatable dome is accomplished either right or left of the line of flight by rotation of the dome 180° in response to pressing a push button switch adapted to be conveniently held in the pilot's hand. Likewise, directional control fore or aft is provided in response to pressing the push button switch, there being other switch means provided for determining response to the push button switch in either the fore-and-aft or left-and-right directions. The system is also adapted to provide successive 90° rotations of the dome responsive to successive actuations of the push button so that photographs may be taken at 90° intervals around a 360° traverse of the dome.

A detailed description of the invention follows with reference to the appended drawings in which.

Figure 6:
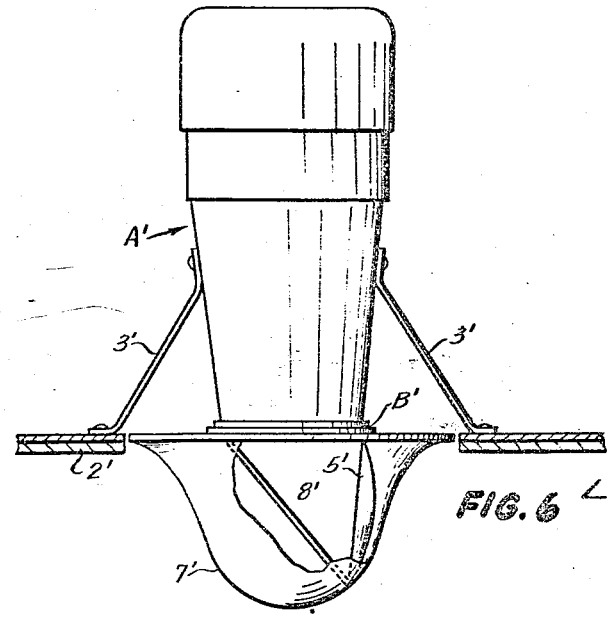
Figure 3:
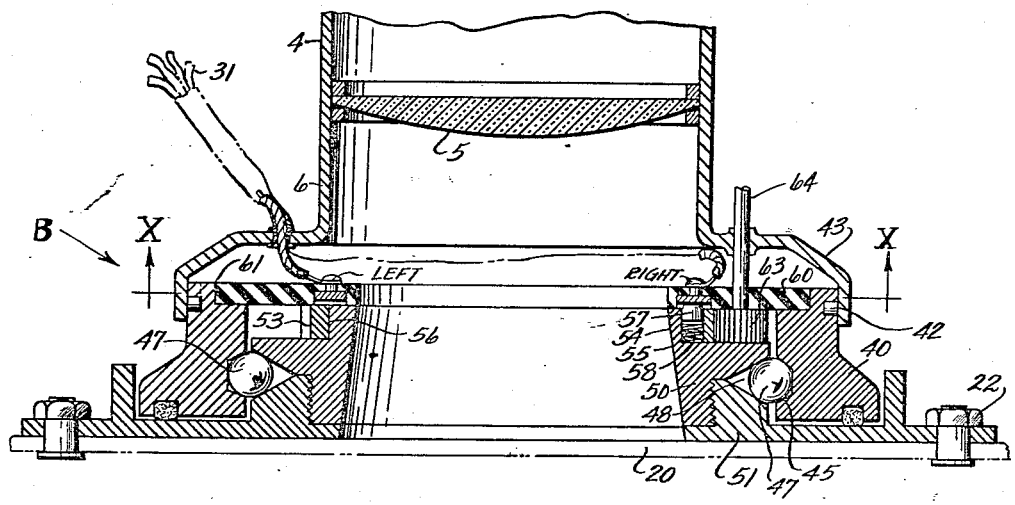
Figure 4:
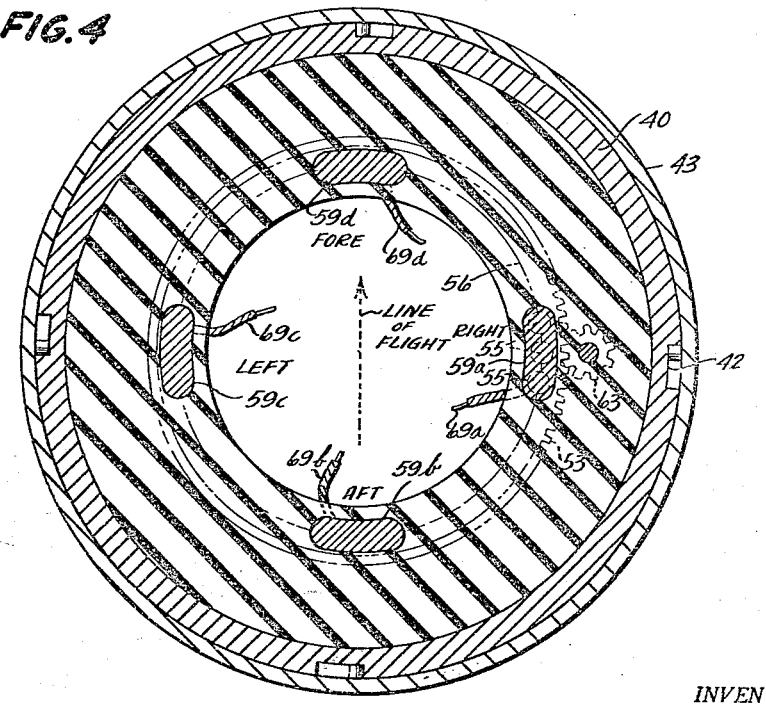

Figure 3 discloses a sectional view of a means for supporting and rotating the dome;

Figure 4 shows a section through the plane X—X of Figure 3;

Figure 5 discloses an electrical system for controlling rotation of the dome; and Figure 6 represents another embodiment of the invention having a modified optical system.

Figure 1:
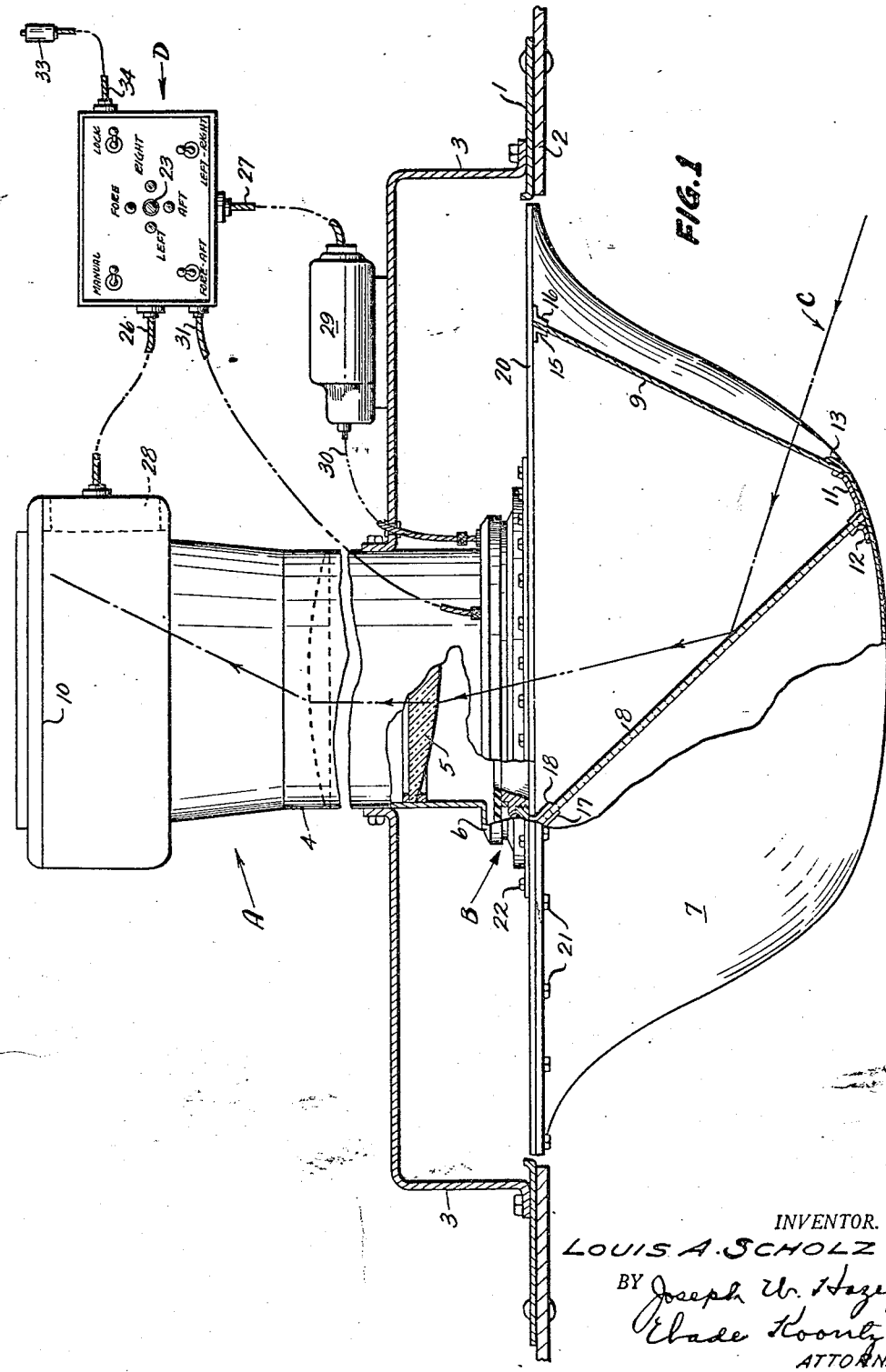
Figure 1 illustrates the general arrangement of a camera and a dome rotatively mounted thereon, the whole structure being adapted to be supported at the bottom wall or skin of the fuselage of an airplane.
Figure 2:
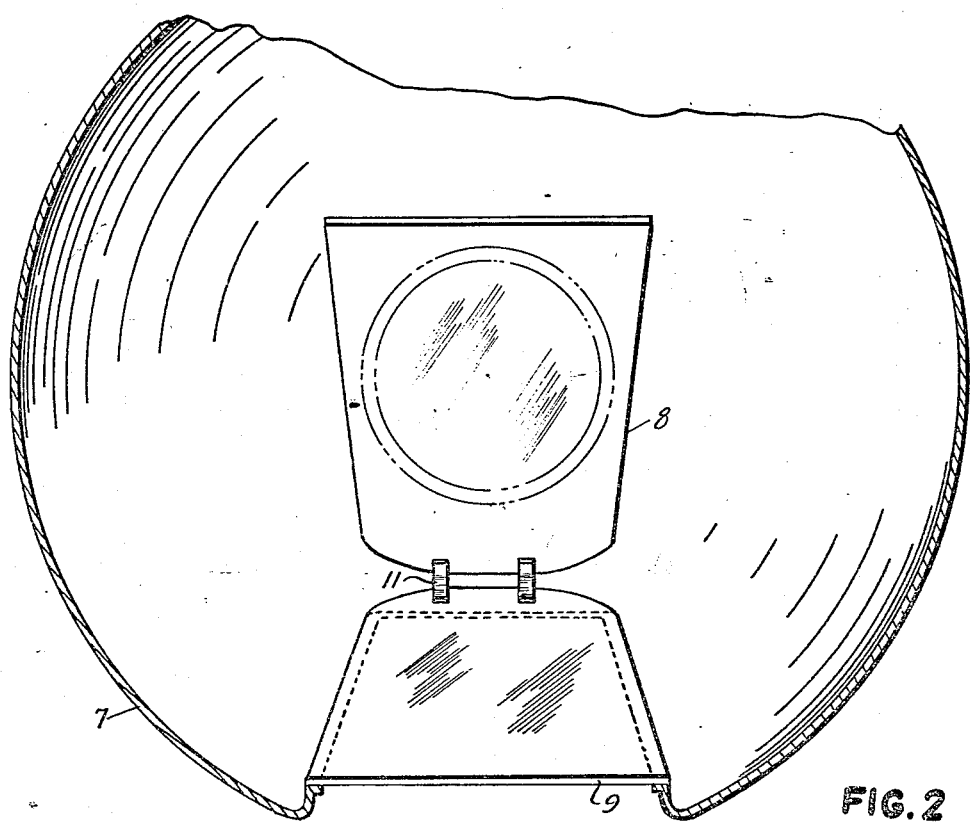
Figure 2 is a plan view interiorly of the dome disclosed in Figure 1.

With reference to Figures 1 and 2, a ring 1 is shown adapted to be secured in any suitable manner around a circular aperture in the wall or skin 2 at the bottom of an airplane fuselage and having secured thereto bracket members 3 to support a camera generally indicated by A. The camera is of a type known in the art having an electric motor and mechanism for taking a series of photographs in rapid succession as long as the motor is energized, the motor and mechanism being contained in the camera body. A lens barrel 4 houses lens 5 and is extended to form a filter holder 6. A dome 7 is rotatably supported by a mechanism B secured to filter holder 6. A mirror 8 and a window 9 are mounted within dome 7 and adapted to rotate therewith and are arranged to transmit light rays by reflection from mirror 8 through lens 5 to the film plane 10 of the camera, as indicated by the bent optical path of a light ray C. The mirror 8 is mounted within dome 7 at a suitable angle relative the skin 2 to avoid including the exterior thereof in the reflected image. Mirror 8 and window 9 are secured by suitable members 11, 12, and 13, attached to the curved portion of the dome, and by members 15, 16, 17, and 18 attached to a cover plate 20. Cover plate 20 is secured to the dome 7 by a plurality of bolts 21 and to the supporting and rotating mechanism B by a plurality of bolts 22. A control box D, adapted to be mounted in the pilot's cockpit, is shown, having a panel on which are mounted four direction indicating signal lamps designated "Left," "Right," "Fore," and "Aft," and three direction selector switches designated as "Left-Right," "Fore-Aft," and "Manual," and a fourth switch designated as "Lock," all for a purpose to be hereinafter described. A fifth lamp 23, centrally disposed of the other four and preferably of different color, is likewise provided on the panel, and is adapted to light at the time of lighting of any of the four direction indicating lamps. The configuration of the five lamps is such that lamp 23 being lit at the same time as one of the other four, the alignment of the two lit lamps and the color difference serves to better indicate direction. Electrical conduits 26 and 27 are shown leading, respectively, to the camera motor 28 and an electric motor 29 operative to rotate dome 7 through a flexible drive cable 30 coupled to mechanism B. A conduit 31 encasing wires of the electrical control system to be hereinafter described is disposed between the control box D and mechanism B. A hand switch 33 of the push button type is provided, adapted to be biased to open position and so constructed as to be conveniently held in the pilot's hand and connected by a flexible conduit 34 to control box D.

The scheme of operation provided for in the structure thus far generally described comprises rotation of the dome 7 by means of the motor 29 through a predetermined arc of rotation to take photographs either fore and aft or right and left of the line of flight of the airplane. At the will of the operator, fore and aft or right and left lines of view are chosen by the appropriately designated switching means on the panel of control box D, the push button 33 then being actuated to rotate the dome to either the fore or aft viewing position, or, the right or left viewing position, an appropriately designated direction indicating lamp and the lamp 23 lighting to indicate the direction in which the mirror is facing, depending upon the line of view chosen and for which the switching means on the face of the control box D has been set.

A detailed description of the rotating means and control system now follows with reference to Figures 3, 4, and 5. In Figures 3 and 4, an enlarged disclosure of the mechanism B is shown wherein a ring 40 is affixed by a conventional pin and slot means 42 to a flange 43 integrally formed on the filter holder 6. Ring 40 has machined therein an outer ball race 45. Ball bearings 47 are retained between the outer race 45 and an inner race 46 comprising sloping external flanges of two collars 50 and 51 threadedly secured together. Collars 50 and 51 are thus rotatively secured to ring 40 and depend therefrom. The collar 50 has a ring gear 53 force fitted about a neck extension 54 and three bores 55 are provided having their centers at the meeting line 56 between gear 53 and neck extension 54 whereby half the material removed to form each bore is removed from neck extension 54 and half from ring gear 53. Each of the bores 55 has a contact means comprising a plunger-like member 57 therein adapted to rotate with collar 50 and biased by a spring 58 into successive sliding electrical contact with four metallic contact elements or segments 59a, b, c, and d, designated as "Right," "Aft," "Left," and "Fore," respectively, relative the line of flight of the airplane which may be assumed to be indicated by the dotted arrow. Contact means 57 are provided in plurality, three such means being shown, in order to insure sufficient electrical contacting area for coaction with the metallic segments 59a, b, c, and d, which are retained in suitable recesses in a ring 60 composed of insulating material and fixedly retained in an annular recess 61 in the upper face of the ring 40 and thus held stationary relative the rotative contact means 57. A pinion 63, having a shaft 64 coupled to the flexible drive cable 30 (Figure 1) and passing through flange 43 and through insulating material 60, is adapted to mesh with the teeth of ring gear 53 and thus rotate the collar 50 from whence is suspended by means of collar 51 and bolts 22, the cover plate 20 of the dome hereinabove described. Accordingly, when motor 29 is energized, pinion 63 is rotated by means of flexible drive cable 30 coupled to shaft 64 causing rotating of ring gear 53 and collar 50 whereby the contact means 57 successively engages the metallic surfaces 59a, b, c, and d, in the order named, if it be assumed that rotation of collar 50 is clockwise, and the dome 7 and mirror 3 rotated simultaneously. The metallic segments 59a, b, c, and d, have leads 69a, b, c, and d, connected thereto, respectively, the four leads passing through conduit 31 to the control box D (Figure 1) for connection with an electrical system as disclosed in Figure 5, comprising two lines 70 and 71 adapted to be connected to an electrical power source. Three relays 73, 75, and 78, included in the system, are adapted to be normally closed in the position shown on this figure of the drawings, i. e., contact normally exists at 73a, 75a, and 78a and b. A conventional step relay 80 is shown, having an intermediate movable contact 81, adapted to make contact alternately between a pair of stationary contacts 80a and 80b, and simultaneously therewith, an intermediate movable contact 82 is adapted to make contact alternately between stationary contacts 80c and 80d, the mechanism of the relay 80 being adapted to alternate contacts as described each time the solenoid thereof is de-energized. All relays of the electrical system are contained in the control box D (Figure 1). Represented in the system are four switches, designated on the diagram as "Left-Right," "Fore-Aft," "Manual," and "Lock," to correspond with Figure 1. The segments 59a, b, c, and d of Figures 3 and 4 are represented and each segment has a signal lamp connected in series therewith, each segment and associated lamp being designated as "Left," "Right," "Fore," or "Aft," to correspond with Figures 1, 3, and 4. The rotating contact means 57 likewise is represented in Figure 5, having a signal lamp in series therewith corresponding to the centrally disposed lamp 23 of Figure 1, and also represented are the motors 28 and 29 and the hand switch 33 with an associated tension spring biasing it to open position.

By way of general description, the circuit arrangement as shown on Figure 5 provides for connections between the pair of stationary contacts 80a and b and alternately disposed contact segments 59a and c, respectively; and likewise the pair of stationary contacts 80c and d are connected to the alternately disposed contact segments 59b and d, respectively. When energized, relay 78 reverses the connections between 59b and 59c, whereby 59b is connected to 80b and 59c is connected to 80c. Accordingly, the relay 73, which acts as a solenoid switch in the circuit of mirror motor 29, is energized when rotating contact means 57 engages any of the four contact segments which happens at the moment to be connected to a contact of relay 80, depending on whether the "Fore-Aft" or the "Left-Right" switch is closed. When relay 78 is in the position shown, only alternately disposed contacts, viz., the "Fore" and "Aft" or the "Left" and "Right" are effective to energize relay 73; when, however, relay 78 is energized by means of the "Manual" switch, all four contacts are effective to energize relay 73, assuming both the "Fore-Aft" and the "Left-Right" switches are closed. A detailed description of the operation of the system now follows:

*Operation—Left and right*

Assuming the condition shown on Figure 5 wherein switch 33 is open and the camera motor 28 is not rotating due to the open contact at 75b, and the "Left-Right" switch is closed, a circuit is established between lines 70 and 71 via the contacts at 73a and 75a, the "Lock" switch, and the mirror motor 29. Accordingly, the dome 7 (Figure 1) is at the moment rotating. Assuming that the rotating contact means 57 is in some intermediate position at this instant, as indicated by the dotted position, the dome 7 will continue to rotate until contact means 57 engages the "Left" segment 59c, as shown in full lines on Figure 5, at which time a circuit will be established between lines 70 and 71 through the solenoid of relay 73, signal lamp 23, rotating contact means 57, the "Left" segment 59c, the "Left" lamp associated therewith, contact 78a, contact 80b, and the "Left-Right" switch. Relay 73 will thus be energized to open contact at 73a, the mirror motor 29 then stopping and the circuit thereof being held open at 73a since rotation of contact means 57 has ceased and it has come to rest on "Left" segment 59c. In this condition, the mirror 8 (Figure 1) is stationary and facing left relative to the line of flight, this condition being indicated to the pilot by the lighting of the "Left" lamp, and the lamp 23, the camera motor 28 still being inactive. If hand switch 33 is now closed so as to energize relay 75 and thus open contact 75a to further ensure the shutting off of current to mirror motor 29 and also to establish contact at 75b, the camera motor 28 is connected across the lines 70 and 71 and will be energized, taking a successive series of pictures as long as switch 33 is held closed. At the same time relay 80 is energized, the mechanism thereof being such that when hand switch 33 is opened, the contacts 81 and 82 take an alternate position whereby contact is made at 80a and 80c and broken at 80b and 80d. Simultaneously with the opening of switch 33, the relay 75 is de-energized and contact at 75a established while contact at 75b is broken, thus stopping the camera motor 28. The relay 73 now being de-energized due to the breaking of contact at 80b, contact is closed at 73a, again establishing a circuit through the mirror motor 29 and causing a continuation of rotation of dome 7 and the rotating contact means 57. Contact means 57 engages the "Fore" segment 59d in this continued rotation, but there is no effect in so doing since the "Fore" segment is in a circuit which is open at 80d at the time. When, however, contact means 57 rotates into engagement with "Right" segment 59a, a circuit will be established between lines 70 and 71 through the "Left-Right" switch, contact 80a, "Right" lamp, "Right" segment 59a, rotating contact means 57, lamp 23, and relay 73, energizing the latter and opening contact at 73a, the mirror 8 thus being stopped facing to the right relative the line of flight, as indicated to the pilot by the lighting of the "Right" lamp and lamp 23, whereby by pressing hand switch 33, another series of photographs may be taken. When hand switch 33 is released, an alternate positioning of step relay 80 takes place once more, whereby contact is made at 80b and d, and broken at 80a and c, which is the initial condition described, 73a then being closed and the mirror motor 29 being energized and continuing to rotate until the rotating contact means 57 passing the "Aft" segment 59b without effect due to the open circuit at 80c, engages the "Left" segment 59c, at which time the mirror 8 is again brought to a stop, facing left. In this manner the mirror 8 may be repeatedly rotated 180°, alternately between left and right viewing directions, by successive actuations of the hand switch 33 whereby the pilot is enabled, without removing his attention from the controls of the plane, to take pictures on both sides of the line of flight with alternate depressions of the hand switch 33.

*Operation—Fore and aft*

Assuming the condition shown in Figure 5 with the exception that the "Left-Right" switch is open and the "Fore-Aft" switch closed, a circuit is established between lines 70 and 71 via the contacts at 73a and 75a, thence through the "Lock" switch and the mirror motor 29, the dome 7 being at the moment rotating. Assuming that the rotating contact means 57 is in some intermediate position at this instant, as indicated by the dotted position, the dome 7 will continue to rotate until means 57 engages the "Fore" segment 59d, passing "Left" segment 59c without effect due to the opening of the "Left-Right" switch. A circuit will then be established between lines 70 and 71 through the solenoid of relay 73, signal lamp 23, rotating contact means 57, the "Fore" segment 59d, and the "Fore" lamp associated therewith, contact 80d and the "Fore-Aft" switch. The solenoid of relay 73 will be thus energized, opening contact at 73a in the circuit of mirror motor 29 and stopping rotation thereof. As indicated by lighting of the "Fore" lamp and lamp 23, the mirror 8 will then be facing forward relative the line of flight of the airplane. If the hand switch 33 now be depressed, the solenoid of relay 75 will be energized making contact at 75b, and thus energizing the camera motor 28 and the mechanism of step relay 80, no motion of the contacts 81 and 82 of step relay 80 taking place, however, at this time, as heretofore described. A series of photographs will be obtained in the forward direction as long as hand switch 33 is depressed. Upon releasing hand switch 33, the solenoid of relay 75 will be de-energized opening contact at 75b to thereby stop the camera motor 28, and simultaneously the mechanism of step relay 80 will function to open contact at 80b and d and close contact at 80a and c, thus de-energizing the solenoid of relay 73 and closing contact at 73a, whereby a circuit is reestablished through the mirror motor 29 in the manner previously described. The dome 7 is then set into rotation once more through an arc of 180° until the rotating contact means 57 engages the "Aft" segment 59b, at which time the solenoid of relay 73 is energized, opening contact at 73a and again stopping the mirror 8 facing in the aft direction relative the line of flight of the airplane, as indicated by lighting of the "Aft" lamp and lamp 23. Depressing the hand switch 33 is now operative to take a series of photographs in the aft direction, and by this mode of operation, photographs may be obtained alternately forwardly and rearwardly along the line of flight.

*Operation—Manual*

Assuming the "Manual," "Fore-Aft," and "Left-Right" switches are closed, the solenoid of relay 78 will be energized whereby contact is opened at 78a and b and closed at 78c and d, thus reversing the connections between segments 59b and c and contacts 80b and c. The mirror motor 29 is at the moment rotating, as in the previous modes of operation, and assuming that the rotating contact means 57 is in the dotted position at the instant, the mirror motor 29 will continue to rotate, the rotating contact means 57 passing the "Left" segment 59c without effect, assuming the contacts of relay 80 in the position shown, since segment 59c is in an open circuit due to the open contact at 80c. However, as continued rotation of mirror motor 29 brings the rotating contact means 57 into engagement with the "Fore" segment 59d, a circuit is established between lines 70 and 71 through the "Fore-Aft" switch, contact 80d, the "Fore" lamp, segment 59d, contact means 57, lamp 23, and the solenoid of relay 73, whereby energization thereof opens the contact 73a, stopping mirror motor 29 with the mirror 8 facing forward of the line of flight. If the hand switch 33 now be depressed, a series of photographs will be obtained. Upon opening hand switch 33, the step relay 80 assumes the alternate position wherein contact is broken at 80b and d and made at 80a and c. The solenoid of relay 73 is de-energized due to the opening of the contact at 80d and rotation of the mirror motor 29 is resumed due to closing of the contact 73a. Rotation continues until contact means 57 engages the "Right" segment 59a, at which time a circuit is established through the "Left-Right" switch, contact 80a, the "Right" lamp, segment 59a, rotating contact means 57, the lamp 23, and the solenoid of relay 73 which is energized and thereby opening contact at 73a and stopping the mirror motor 29. If hand switch 33 now be depressed, a successive series of photographs will be obtained in a direction to the right of the line of flight. Upon opening hand switch 33, relays 73 and 80 again assume the position of original condition shown in Figure 5, mirror motor 29 is energized and dome 7 is rotated through another 90° arc until contact means 57 contacts the "Aft" segment 59b thereby energizing relay 73 by a circuit through the "Left-Right" switch, contact 80b, 78d, the "Aft" lamp, segment 59b, rotating contact means 57, the lamp 23, and the solenoid of relay 73, the mirror motor 29 thus being stopped by opening of the contact 73a.

After hand switch 33 has been depressed to take a series of photographs in the aft direction, and released, contact at 73a is closed to start the mirror motor 29 and relay 80 assumes a position wherein contact is made at 80a and c and broken at 80b and d thereby rendering the "Left" segment 59c operative to stop the mirror motor 29 at the end of the succeeding 90° travel of dome 7 when contact means 57 engages segment 59c. In this manner, photographs may be obtained every 90° around a 360° traverse.

In the event that it is desired to hold the mirror 8 in any given position, opening the "Lock" switch will deprive mirror motor 29 of current independently of the functioning of the remainder of the electrical system. Further, the mirror motor 29 may be stopped at any time by depressing the hand switch 33 which energizes relay 75 to open contact at 75a in the circuit of mirror motor 29.

For the sake of simplicity, the switches designated as "Left-Right," "Fore-Aft," and "Manual" are illustrated as independently operable individual switches in the drawings, but as a matter of actual practice, conventional combination switch structures are used whereby closing of the "Manual" switch automatically closes the "Fore-Aft" and "Left-Right" switches and closing of either the "Left-Right" or "Fore-Aft" switches automatically opens the other two. The electrical control system which has been described is not regarded as being limited in utility to the photographic art, nor is it necessarily limited to control of electric motors, e. g., the camera motor 28 could be replaced by any device which consumes electric current, and mirror motor 29 could be replaced by any energy consuming device, such as an hydraulic turbine, since it is apparent that the operation of the system is not dependent on the form of energy supplied thereto, it being necessary only to provide a means responsive to electric current, such as relay 73, and adapting said means to control any given type of energy consuming device.

In the form shown on Figure 6, the modification consists of a structure comprising a camera body A', supported by brackets 3' over an aperture in the wall or skin 2' of an airplane, and having a lens 5' adapted to receive light rays directly from the object terrain and secured within a dome 7' rotatably suspended from the camera body A' by suitable mechanism B', there being a mirror 8' inside the dome for reflecting light rays from lens 5' to the film plane (not shown) of the camera body A'. The embodiment shown in Figure 6 distinguishes from the form shown in Figure 1 in the mounting of the lens within the dome. Since the rays of light from the object terrain go directly through the lens and are converged thereby before striking the mirror 8', the size of the mirror required is smaller for the same size film image than that required in the form shown in Figure 1, and the size of the dome 7' may be reduced accordingly. The mechanism B' and an electrical control system therefor may be identical with that previously described.

Attention is called to the fact that a transparent dome having a suitable light transmitting surface could be used in conjunction with my disclosures; and in the form shown in Figure 6, as a means of protection for the exposed surface of the lens 5', a window could be provided exteriorly thereof, all without departing from the spirit of my invention which I seek to protect by United States Letters Patent within the scope of the claims appended hereto.

I claim:

1. In a photographic device, in combination, a camera including a camera body having an electric motor therein and adapted to take successive photographs when said camera motor is energized, and a rotatable mirror whereby the image of an object to be photographed follows a bent optical path to the film plane of said camera from selected directions, electrical means comprising selector switch means operative to control rotation of said mirror relative to said camera body through predeterminable arcs for taking photographs at selected intervals in a 360° traverse, and including a hand switch operative to simultaneously energize said camera motor and stop rotation of said mirror, the arrangement of said hand switch and said selector switch means being such that said camera motor and said mirror rotating means may be alternately energized for taking photographs at selected intervals within a 360° traverse as determined by said selector switch means or at any point in said 360° traverse by operation of said hand switch.

2. In an aerial camera comprising an optical system having a rotatable reflector for taking photographs in predeterminable directions, an electrical control system for controlling rotation of said reflector comprising a plurality of contact elements, a contact member, means for providing successive engagement of said contact member with said contact elements responsive to rotation of said reflector, a relay having a plurality of stationary contacts connected to said contact elements and having movable contacts adapted to selectively engage said stationary contacts, means for providing selective engagement between said stationary contacts and said movable contacts, respective selector switches associated with said movable contacts whereby a series circuit may be established through said contact member, one of said contact elements, a stationary contact, a selected movable contact, and the selector switch associated with said movable contact depending on the closing of said selector switch and engagement of said contact member with said one contact element.

3. In an aerial camera having an electrical control system as set forth in claim 2, including switch means connected intermediate said stationary contacts and said contact elements whereby connections from non-adjacently disposed contact elements may be reversed, thereby providing for the establishment of said series circuit by engagement of said contact member with adjacently disposed contact elements, or, non-adjacently disposed contact elements, as determined by operation of said intermediate switch means.

4. In an aerial camera comprising an optical system having a rotatable reflector for taking photographs in predeterminable directions, an electrical control system for controlling rotation of said reflector comprising a plurality of contact elements, a contact member, means providing successive engagement of said contact member with said contact elements responsive to rotation of said reflector, a relay having contacts arranged in pairs, each pair being connected to non-adjacently disposed contact elements, said relay having an intermediate contact means associated with each pair of contacts and adapted for alternate engagement therewith, means providing alternate engagement thereof, selector switch means associated with each intermediate contact means whereby a series circuit is established through said contact member, a contact element, the contact of one pair of contacts connected thereto, the intermediate contact means in engagement with said contact and the selector switch means associated therewith, depending on closing of said selector switch means and engagement of said contact member with said contact element.

5. In an aerial camera comprising an optical system having a rotatable reflector for taking photographs in predeterminable directions, an electrical control system for controlling rotation of said reflector comprising a plurality of contact elements, a contact member, means providing successive engagement of said contact member with said contact elements responsive to rotation of said reflector, a step relay having a plurality of relay contacts arranged in pairs and connected to alternately disposed contact elements, said step relay having intermediate contacts between said pairs of contacts, and means providing alternate engagement of said intermediate contacts with either of the associated pairs of relay contacts, selector switch means associated with said intermediate contacts, whereby a series circuit may be established through said contact member, one of said alternately disposed contact elements, its associated relay contact, the intermediate contact engaged therewith and its associated selector switch means, depending on the closing of said selector switch means and engagement of said contact member with said contact element.

6. In an aerial camera having an electrical control system as set forth in claim 4, including means for reversing one connection from each pair of contacts so as to connect adjacent contact elements to pairs of relay contacts whereby engagement of said contact member with any of said contact elements is operative to establish a series circuit through said contact member, said contact element, the relay contact then connected to said contact element, the intermediate contact in engagement with said relay contact, and the selector switch means associated therewith depending on the closing of said selector switch means.

7. In an aerial camera comprising an optical system having a rotatable reflector for taking photographs in predeterminable directions, an electrical control system for controlling rotation of said reflector comprising a plurality of contact elements and a contact member adapted to successively engage said contact elements responsive to rotation of said reflector, a step relay having a pair of relay contacts and an intermediate contact adapted for alternate engagement with either of said relay contacts, means providing for alternate engagement thereof, said relay contacts being connected with said contact elements whereby at the time said contact member engages any of said contact elements connected to a relay contact in engagement with said intermediate contact, a series circuit is established comprising said contact member, said contact element, said relay contact and said intermediate contact.

8. In an aerial camera comprising an optical system having a rotatable reflector for taking photographs in predeterminable directions, an electric motor for rotating said reflector and an electrical control system for predetermining arcs of rotation of said electric motor comprising a plurality of arcuately spaced contact elements, a contact member, means providing relative rotation between said contact elements and said contact member responsive to rotation of said reflector whereby said contact member is adapted to successively engage said contact elements, and a step relay having a plurality of pairs of stationary contacts connected to alternately disposed contact elements, said step relay having a movable contact between each pair of stationary contacts and selector switch means in series between each of said movable contacts and one side of an electric line, a solenoid operated switch controlling said electric motor, the solenoid of said switch being in series with said contact member and the other side of the line, a switch for energizing the solenoid of said step relay, said step relay being adapted to alternate engagement of said movable contacts from one to the other of said stationary contacts upon operation of said switch, whereby engagement of said contact member with any contact element connected through said relay to one of said selector switches is operative to energize said solenoid switch to stop said motor, depending on closing of said selector switch.

9. In an aerial camera comprising an electric motor for actuation of the film and shutter thereof, and including a rotatable reflector for taking photographs in predeterminable directions, a second electric motor for rotating said reflector and an electric control system for providing alternate operation of said camera motor and said reflector motor comprising a switch adapted to be biased to open position, a relay controlled by said switch and operative to energize said camera motor, a step relay comprising a plurality of contacts arranged in pairs and having an intermediate contact in each pair adapted to alternately engage each contact of said pair of contacts upon de-energization of said step relay, said step relay being energized in response to the closing of said switch whereby opening of said switch is operative to provide said alternate engagement, a selector switch associated with each intermediate contact, a contact member, a plurality of contact elements, means providing successive engagement between said contact member and said contact elements in response to energization of said reflector motor, said pairs of contacts being connected to non-adjacently disposed contact elements, means effective to start or stop said reflector motor and being operative to stop said reflector motor upon engagement between said contact member and one of said contact elements whereby a series circuit is established including said contact member, said contact element, the contact of said step relay connected thereto, the intermediate contact in engagement with said contact and the selector switch associated with said intermediate contact, depending on the closing of said switch.

10. In an aerial camera having an electrical control system as set forth in claim 9, including means adapted to be set for reversing connections from non-adjacently disposed contact elements to said step relay whereby engagement of said contact member with adjacently disposed contact elements or with non-adjacently disposed contact elements is effective to establish said series connection, depending on the setting of said reversing means.

11. In an aerial camera, a lens barrel and an optical system including optical elements disposed for rotation about the axis of said lens barrel and exteriorly thereof, means for supporting and rotating said optical elements comprising a ring secured to said lens barrel and having an annular bearing race, collar means concentric with said ring and having an annular bearing race, bearings retained between said bearing races whereby said ring and said collar means are rotatively secured, means for providing relative rotation therebetween, and electrical contact means rotatively associated with said ring and collar means whereby relative rotation between said ring and collar means is operative to provide successive electrical engagements of said electrical contact means for coaction with an electrical control system for controlling rotation of said optical elements.

12. In an aerial camera, a lens barrel and an optical system including elements disposed for rotation about the axis of said lens barrel and exteriorly thereof, means for supporting and rotating said optical elements, and electrical contact means disposed for rotation with said optical elements and adapted to provide electrical contact engagements successively with rotation thereof for coaction with an electrical control system for controlling rotation of said optical elements.

13. In an aerial camera as set forth in claim 12, wherein said electrical contact means comprises a ring of insulating material co-axial with said lens barrel and having arcuately spaced metallic segments secured thereto.

14. In an aerial camera as set forth in claim 12, wherein said supporting and rotating means comprises a ring secured to said lens barrel and having an internal annular bearing race, and a collar within said ring comprising ring-like members threadedly secured together and having an external annular bearing race provided between opposing flanges of said members, and bearing means retained between said races whereby said ring and said collar are rotatively secured together.

15. In an aerial camera as set forth in claim 12, wherein said supporting and rotating means comprises a ring secured to said lens barrel and a collar rotatively secured to said ring, said optical elements being supported by said collar and said electrical contact means comprising a member of insulating material supported by said ring and having arcuately spaced metallic contact segments, and means provided on said collar adapted to successively contact said metallic segments with relative rotation between said ring and collar.

16. In an aerial camera comprising an electric motor for actuation of the film and shutter thereof, and including a rotatable reflector for taking photographs in predeterminable directions, a second electric motor for rotating said reflector and an electrical control system for alternately energizing said motors and determining the duration of energization of said reflector motor, comprising a contact member, a plurality of contact elements, means responsive to energization of said reflector motor for providing successive engagement between said contact member and said contact elements synchronized with operation of said reflector motor, a step relay having contacts connected to said contact elements and selector switch means associated selectively with said relay contacts, means for energizing said step relay and simultaneously energizing said camera motor, said step relay being adapted to alternate connections between said relay contacts and said contact elements upon de-energization of said step relay, and means associated with said reflector motor responsive to engagement of said contact member with one of said contact elements dependent upon operation of said selector switch means for de-energizing said reflector motor.

17. In an electrical control system as set forth in claim 16, including means for reversing a plurality of connections between said contact elements and said step relay whereby engagement of said contact member with adjacent or non-adjacent contact elements is operative to effect de-energization of said reflector motor depending on operation of said reversing means.

18. In a system for selecting one of a number of predetermined lines of view of optical elements of an aerial camera, means for rotating said optical elements through a plurality of predetermined lines of view, a contact member, a plurality of contact elements corresponding in number to the number of predetermined lines of view, said contact member and said contact elements being adapted for successive engagement therebetween synchronized with rotation of said optical elements whereby successive engagements occur coordinately with rotation of said optical elements through successive predetermined lines of view, and a control system associated with said contact elements and said contact member including means rendering said system responsive to engagement of said contact member with a selected contact element whereby said engagement is operative to effect de-energization of said rotating means for the purpose of fixing the viewing direction of said optical elements along a predetermined line of view corresponding to said selected contact element.

19. In a system as set forth in claim 18, wherein said control system comprises an electrical system including a relay having relay contact connected to said contact elements and selector switch means associated with said relay for selecting lines of view.

20. In a system as set forth in claim 18, wherein said control system comprises an electrical system including a relay having two pairs of relay contacts, and said contact elements comprise four metallic segments arcuately spaced 90° apart, the contacts of each pair of relay contacts being connected to non-adjacently disposed metallic segments, and selector switch means associated with said relay operative to render pairs of said metallic segments responsive to engagement with said contact member for de-energizing said rotating means.

21. In an aerial photography device, an aerial camera adapted to be mounted on an aircraft, a reflector adapted to be rotatably mounted on the aircraft for transmitting an image to be photographed to the film plane of the camera, power means for rotating the reflector, limit switch means actuated by rotation of said reflector to de-energize said power means when the reflector is in any one of a plurality of predetermined positions, a manually actuated switch and means connected to said limit switch means to render said manually actuated switch effective upon subsequent openings thereof to cause said power means to rotate the reflector sequentially from one predetermined position to another, whereby the reflector may be positioned at will in any selected one of said predetermined positions.

22. The structure as claimed in claim 21 in which said limit switch means includes a plurality of switches each positioned for operation by rotation of said reflector into a respective one of said predetermined positions, means for rendering all but one of said limit switches inoperative, and means operative when the mirror has rotated into the position for actuation of said one effective switch for rendering another of said switches operative, said last two named switches being rendered alternately operative whereby said reflector may be sequentially positioned in only two of said predetermined positions by successive openings of said manually actuated switch means.

23. In an aerial camera, in combination, a camera including a camera body having a lens barrel and a lens therein, means for mounting said camera body on the floor of an airplane so that the lens barrel is substantially aligned with a cut-out area in said floor, a protective dome rotatably supported on said lens barrel and adapted to be disposed outwardly of said airplane floor in the air stream, reflector means secured in said dome within the field of view of said lens and completely shielded in said dome from said air stream, and means permitting transmission of light rays through said dome to said reflector means, whereby rotation of said dome is operable to directionally vary the photographic view of said camera.

24. In a photographic device, means for controlling rotation of elements of a camera optical system through a 360° traverse for obtaining photographs in predeterminable directions, comprising an electric motor for rotating said elements and control means for said motor comprising relay means operative to cut off current to said motor, selector switch means, and a plurality of arcuately spaced electrical contact means rotatable with said optical elements and electrically associated with said relay means through said selector switch means, said selector switch means being operative to selectively provide electrical continuity through said contact means to said relay means for predetermining the arc of rotation of said elements by cutting off current to said motor upon energization of said relay means resulting from current conduction through a selected contact means.

25. In a photographic device for an airplane, in combination, a motor actuated camera, a reflector adapted to be rotated for directionally varying the photographic view of said camera, a motor for rotating said reflector, and a control system having means for alternately energizing said camera motor and said reflector motor, including a manually operable two-position switch, said means being constructed and arranged to energize said reflector motor and to cut off said camera motor when said switch is in a first position, and to cut off said reflector motor and energize said camera motor when said switch is in a second position.

26. In a photographic device as set forth in claim 25, including means in said control system for predetermining cutoff points of said reflector motor in preselected viewing directions fore and aft or left and right, said manual switch and said predetermining means being so arranged as to preset said control system in response to shifting of said manual switch from said first to said second position to cause rotation of said reflector from left to right or vice versa, or, from fore to aft or vice versa responsive to actuation of said manual switch in subsequently shifting from said second to said first position.

27. In a photographic device, in combination, a camera including a camera body and a mirror whereby the image of an object to be photographed follows a bent optical path to the film plane of said camera body, means for rotating said mirror relative said camera body through predeterminable arcs for taking photographs at selected intervals in a 360° traverse, comprising a motor for rotating said mirror, power cut-off means rotative with said mirror, and means selectively operative to render said power cut-off means effective to cut off power to said motor after said mirror has rotated through a predetermined arc, said power cut-off means comprising a contact member and a plurality of electrical contact elements adapted for rotation relative said contact member and for successive engagement therewith during rotation of said mirror, said selectively operative means comprising selector switch means and relay means associated with said contact member and contact elements, said selector switch means being adapted to render one of said contact elements operable to energize said relay means to cut off power to said motor, and means whereby said relay means is adapted to predetermine operability of a second contact element to cut off said motor subsequent to resumption of power continuity through said motor.

LOUIS A. SCHOLZ.